United States Patent
Goldman

(10) Patent No.: US 11,064,676 B2
(45) Date of Patent: Jul. 20, 2021

(54) PET FURNITURE APPARATUS AND METHOD FOR ASSEMBLING SAME

(71) Applicant: Penn-Plax, Inc., Hauppauge, NY (US)

(72) Inventor: Terry Goldman, Lloyd Harbor, NY (US)

(73) Assignee: Penn-Plax, Inc., Hauppauge, NY (US)

(*) Notice: Subject to any disclaimer, the term of this patent is extended or adjusted under 35 U.S.C. 154(b) by 140 days.

(21) Appl. No.: 15/885,257

(22) Filed: Jan. 31, 2018

(65) Prior Publication Data

US 2019/0230896 A1    Aug. 1, 2019

(51) Int. Cl.
    *A01K 15/02* (2006.01)
    *A01K 1/03* (2006.01)
    *A01K 1/035* (2006.01)

(52) U.S. Cl.
    CPC .............. *A01K 1/033* (2013.01); *A01K 1/035* (2013.01); *A01K 15/02* (2013.01); *A01K 15/024* (2013.01)

(58) Field of Classification Search
    CPC .............................. A01K 15/02; A01K 15/024
    USPC .......................................................... 119/706
    See application file for complete search history.

(56) References Cited

U.S. PATENT DOCUMENTS

| | | | | |
|---|---|---|---|---|
| 3,479,990 A * | 11/1969 | Crow | ................... | A01K 15/024 119/28.5 |
| 3,595,209 A * | 7/1971 | Parker | ................... | A01K 15/024 119/706 |
| 4,101,232 A * | 7/1978 | Haapala | ................ | A21C 15/002 403/261 |
| 4,586,844 A * | 5/1986 | Hammonds | ................ | E04G 7/20 182/178.3 |
| 5,577,466 A * | 11/1996 | Luxford | ................ | A01K 15/025 119/485 |
| 5,713,306 A * | 2/1998 | Johnson | ................ | A01K 15/024 119/485 |
| 5,806,464 A * | 9/1998 | Willinger | ............. | A01K 15/025 119/706 |
| 5,884,586 A * | 3/1999 | Carbonelli | ............. | A01K 1/033 119/485 |
| 5,904,420 A * | 5/1999 | Dedoes | ................. | B01F 7/1695 366/198 |
| 6,062,150 A * | 5/2000 | Sikora | ................. | A47B 87/0223 108/190 |
| 8,020,518 B1 * | 9/2011 | Reinke | ................. | A01K 15/025 119/482 |
| 2005/0046133 A1 * | 3/2005 | Braucke | ............. | A47B 87/0223 280/47.35 |
| 2010/0154719 A1 * | 6/2010 | Kellogg | ................ | A01K 15/024 119/706 |
| 2012/0312239 A1 * | 12/2012 | Wedertz | ............... | A01K 15/024 119/28.5 |
| 2014/0033987 A1 * | 2/2014 | Hoffman | ................. | A01K 15/02 119/706 |

* cited by examiner

Primary Examiner — David J Parsley
(74) Attorney, Agent, or Firm — The Farrell Law Firm, P.C.

(57) ABSTRACT

A method of assembling pet furniture includes placing a first end of a pillar beam into a stable locking system (SLS) mount affixed to a base platform; placing a second end of the pillar beam into an SLS mount affixed to a top platform; attaching the top platform to the bottom platform by twisting the pillar beam to lock the first end of the pillar beam to the SLS mount affixed to the base platform and to lock the second end of the pillar beam to the SLS mount affixed to the top platform.

18 Claims, 4 Drawing Sheets

PET FURNITURE APPARATUS AND METHOD FOR ASSEMBLING SAME

BACKGROUND

1. Field of the Disclosure

The present disclosure relates generally to a pet furniture apparatus and a method for assembling the pet furniture apparatus, and more particularly, to a method for assembling pet furniture using a stable locking system (SLS) and a pet furniture apparatus.

2. Description of Related Art

Traditional methods for assembling pet furniture can be difficult and frustrating for a user. Pet furniture often contains a number of pieces that require the user to assemble them. If the number of pieces is too great, or if the assembly instructions are too difficult, then the user may experience frustration with the assembly process. Or, if the user accidently assembles the pet furniture incorrectly, then a pet can be harmed by the poor craftsmanship of the furniture.

Traditional pet furniture is assembled using screws, nuts, and other similar components. These components are particularly susceptible to becoming worn down over time. When pet furniture is assembled, disassembled, and reassembled, then it is important for the assembly items not to become easily worn down. For instance, when screws and nuts are used in assembly, then the threading of these items may be worn down over time, such that it becomes difficult, if not impossible, to disassemble or reassemble the pet furniture. Or, if the traditional pet furniture has been assembled or used for a long time, then the traditional assembly items (i.e., screws and nuts) may become affixed to each other, or sometimes warped, so that they cannot be detached and reattached properly. Or, in some cases, if the threading of traditional assembly items becomes worn down, then the attached components may spin on loose threading or fail to properly attach to other components of the pet furniture.

SUMMARY

The present disclosure has been made to address at least the above mentioned problems and/or disadvantages and to provide a method for assembling pet furniture using a stable locking system (SLS) and an apparatus therefor.

According to an aspect of the present disclosure, a method of assembling house pet furniture is provided, the method including placing a first end of a pillar beam into a first locking mount affixed to a base platform; placing a second end of the pillar beam into a first locking mount affixed to a top platform; and attaching the top platform to the bottom platform by rotating the pillar beam to lock the first end of the pillar beam to the first locking mount affixed to the base platform and to lock the second end of the pillar beam to the first locking mount affixed to the top platform.

According to another aspect of the present disclosure, a pet furniture apparatus having an interlocking assembly system includes a base platform having a first locking mount affixed thereon; a top platform having a first locking mount affixed thereon; and a pillar beam with a first end and a second end, wherein the top platform attaches to the bottom platform upon rotating the pillar beam when the first end of the pillar beam is placed into the first locking mount affixed to the base platform and the second end of the pillar beam is placed into the first locking mount affixed to the top platform.

BRIEF DESCRIPTION OF THE DRAWINGS

The above and other aspects, features, and advantages of the present disclosure will be more apparent from the following description taken in conjunction with the accompanying drawings, in which.

DETAILED DESCRIPTION

Figure 1:
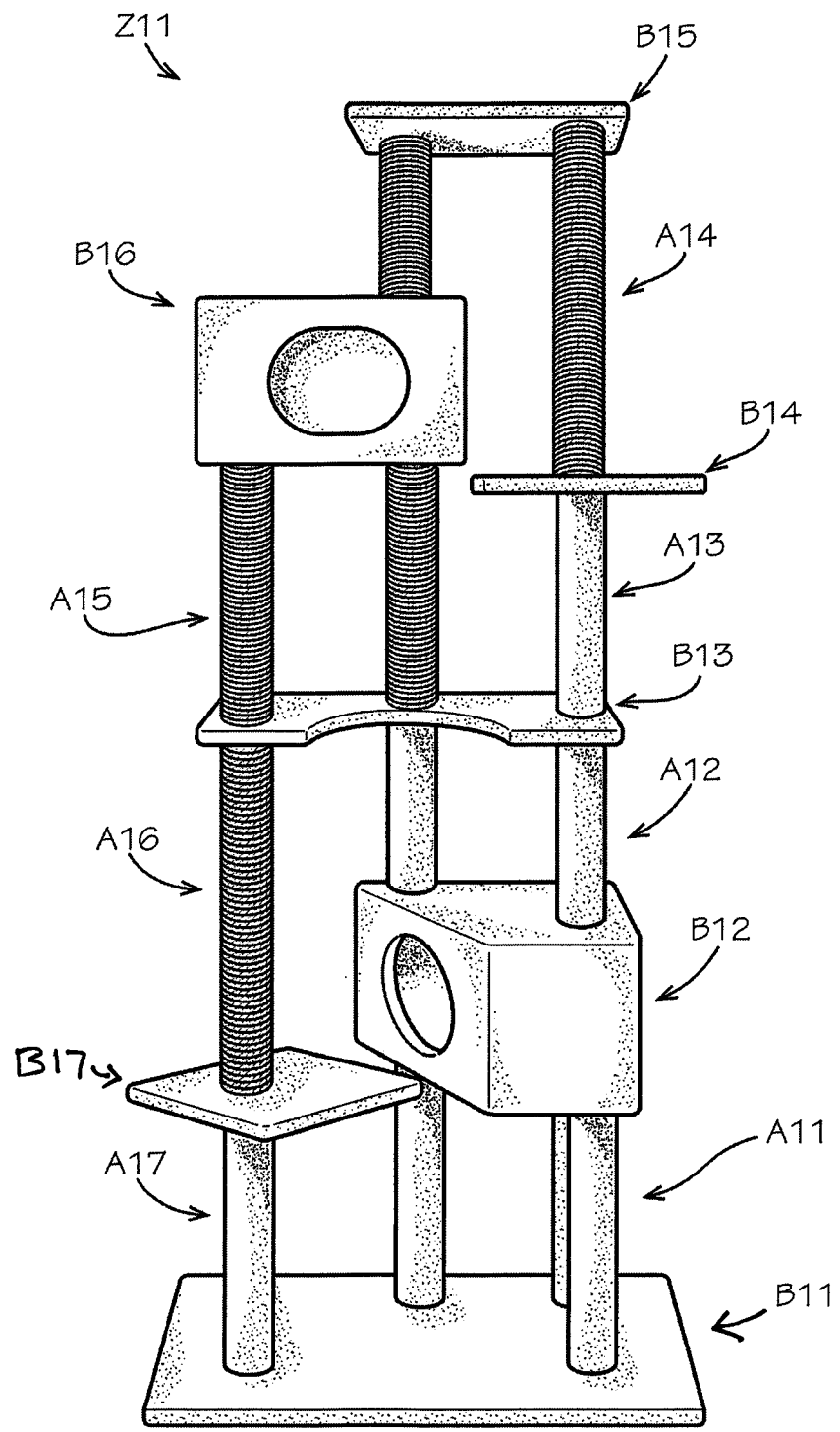
FIG. 1 illustrates a pet furniture apparatus after it has been assembled.

The following description with reference to the accompanying drawings is provided to assist in a comprehensive understanding of embodiments of the present disclosure as defined by the claims and their equivalents. It includes specific details to assist in the understanding, but those of ordinary skill in the art will recognize that various changes and modifications of the embodiments described herein may be made without departing from the scope and spirit of the present disclosure. In addition, descriptions of well-known functions and constructions may be omitted for clarity and conciseness.

The terms and words used in the following description and claims are not limited to their dictionary meanings, but, are merely used to enable a clear and consistent understanding of the present disclosure. Accordingly, it should be apparent to those skilled in the art that the following description of embodiments of the present disclosure is provided for illustration purposes only and not for the purpose of limiting the present disclosure.

The present disclosure provides a method for easily assembling pet furniture, and an apparatus thereof, which is an improvement over conventional pet furniture assembly methods because it provides a novel pet furniture interlocking assembly system (i.e., the SLS) that firmly connects pieces of the pet furniture assembly with minimal time and effort on the part of a user.

In an embodiment of the present disclosure, a pet furniture assembly system includes tubular pillar beams. These pillar beams connect to platforms that are secured to the top of, or below, the pillar beams. When the pet furniture is assembled and placed in an upright position, the pillar beams appear vertical, and connect the platforms, which appear horizontal, and in parallel to each other.

A pet furniture assembly, sometimes called a "tree", may contain a large number of pillar beams and platforms. The pillar beams and platforms can be arranged on top of each other to build larger and more detailed pet furniture designs than could be appreciated with a lesser number of pillar beams and platforms.

Pillar beams and platforms may include an outer layer for use by a pet. For example, an outer layer of a pillar beam may include a textile material, such as cloth, fabric, rope, yarn, or tweed. An outer layer of a platform may include a soft carpet material, velvet, or even a litter box for use by a pet.

In addition to pillar beams and platforms, other pet furniture components may be used in the pet furniture assembly of the present disclosure. For example, part or all of a platform can be made of a house component for a pet. The house component may have different dimensions and characteristics than a platform (i.e., a house component may be hollow for a pet to occupy it, and have windows for a pet to see out of). Or, for example, a bed component may replace all or some of a platform.

Pet furniture components of various shapes and sizes are known in the art, and the present disclosure, as well as the claims which follow, are directed to a novel assembly mechanism for these components. The term "platform" is used merely to represent typical components of pet furniture that are well known in the art.

FIG. 1 illustrates a pet furniture apparatus after it has been assembled.

Referring to FIG. 1, the pet furniture apparatus Z11 is assembled and in an upright position. The pet furniture apparatus Z11 includes tubular pillar beams A11-A17 to connect platforms B11-B17. Pillar beams A11-A17 may be of various lengths and sizes, depending on a configuration of the pet furniture apparatus. For example, pillar beam A16 has a greater length than pillar beam A12.

In the embodiment shown in FIG. 1, platform B11 is a base platform, and platform B17 is a top platform with respect to platform B11. Pillar beam A17 connects platform B11 to platform B17.

Platform B17 is a base platform with respect to platform B13. Platform B13 is a top platform with respect to platform B17. Pillar beam A16 connects platform B13 to platform B17.

Platform B12 is a top platform with respect to platform B11. Platform B11 is a base platform with respect to platform B12. Pillar beam A11 connects platform B11 to platform B12.

Platform B12 is a different type of platform than platform B11. Platform B12 is hollow and is a house-type platform, and platform B11 is a flat platform.

One or more pillar beams may connect one platform to another. For example, in some configurations, a single pillar beam connects a first platform to a second platform. In other configurations, multiple pillar beams connect the first platform to the second platform.

A particular platform may be a base platform in a first instance, and also a top platform in a second instance (i.e., consider that platform B17 is a top platform with respect to platform B11, and is a base platform with respect to platform B13). Whether a particular platform is a base platform or a top platform depends on the configuration of the pet furniture once it is assembled and oriented to an upright position.

Figure 2:
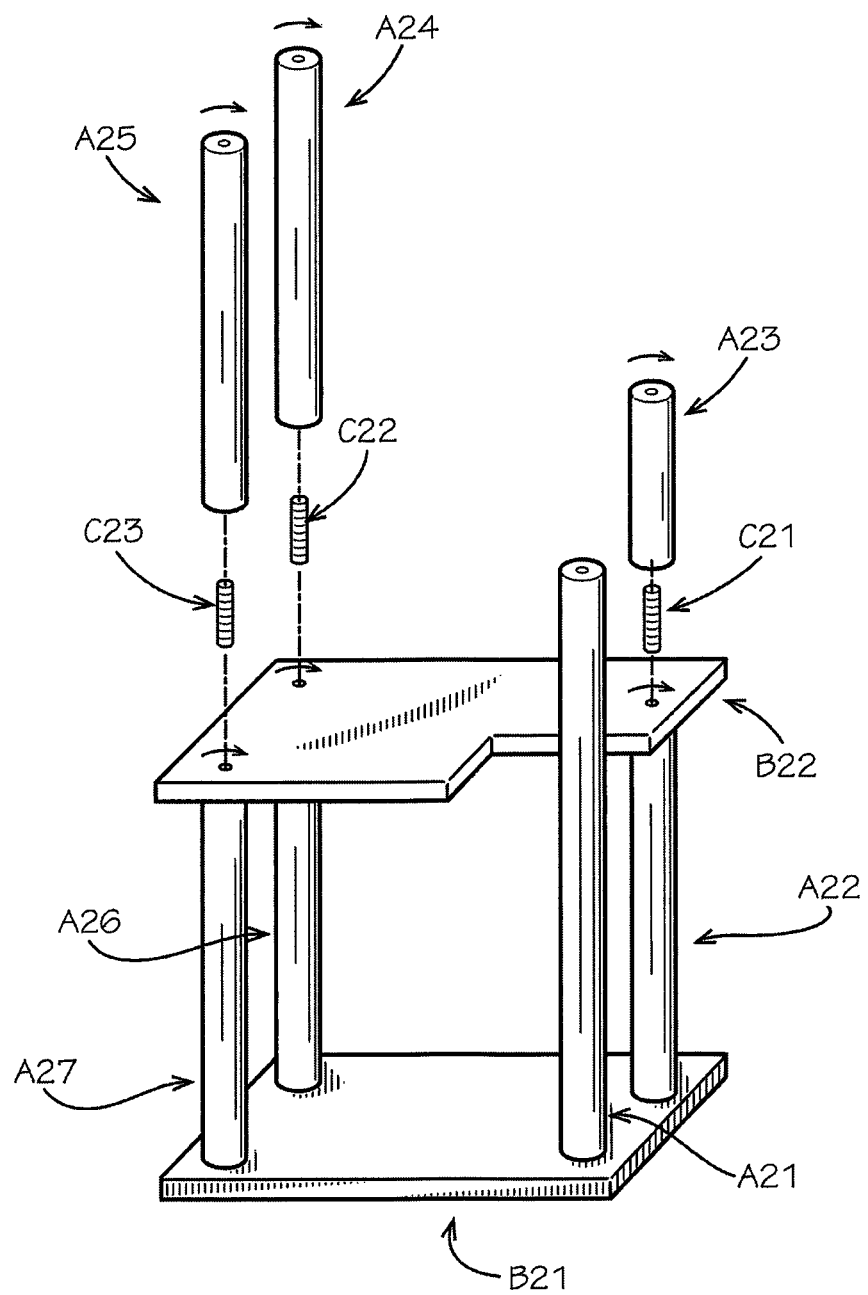
FIG. 2 illustrates an assembly mechanism for attaching components of a conventional pet furniture apparatus.

FIG. 2 illustrates an assembly mechanism for attaching components of a conventional pet furniture apparatus.

Referring to FIG. 2, pillar beams A21, A22, A26, and A27 connect base platform B21 to top platform B22. Platform B22 is secured into place by using attaching components C21-C23. Attaching components C21-C23 are assembled to protrude through designated openings on platform B22, and pillar beams that are placed on opposite surfaces of platform B22 are connected using attaching components C21-C23. For example, attaching component C21 connects pillar beam A23 to pillar beam A22.

Figure 3:
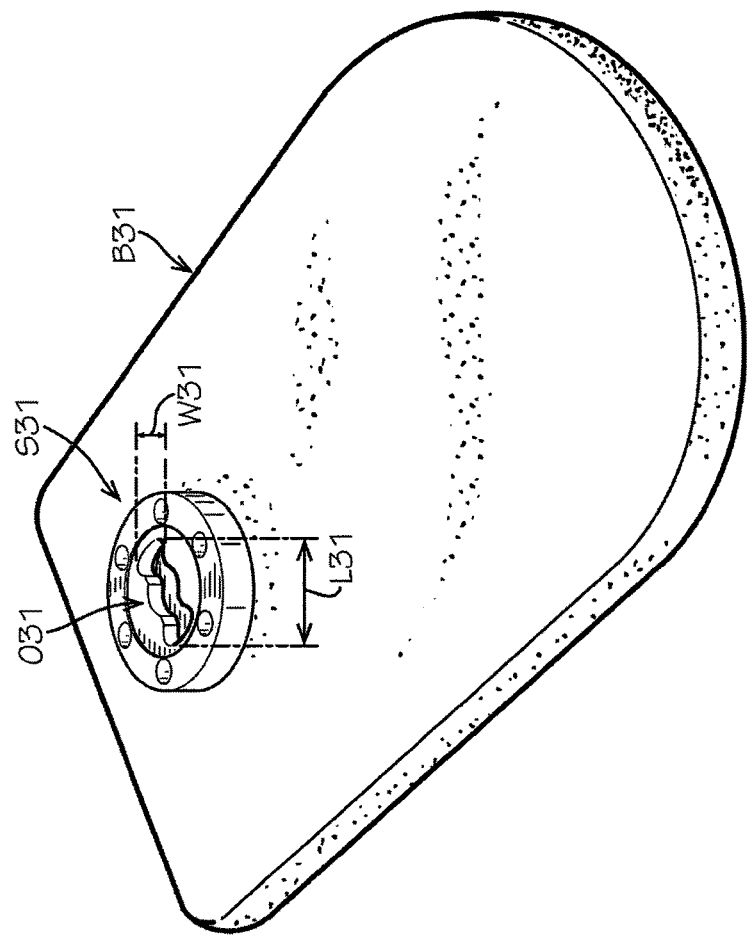
FIG. 3 illustrates a perspective view of an SLS mount used to attach components of a pet furniture apparatus.

FIG. 3 illustrates a perspective view of an SLS mount used to attach components of a pet furniture apparatus.

Referring to FIG. 3, the SLS locking mount S31 is attached to a surface of the platform B31. The SLS mount S31 includes opening O31 having a predetermined shape. The interior of the SLS mount S31 is hollow and may be accessed through the opening O31. The opening O31 has a length L31 and a width W31 for an exterior component corresponding to the predetermined shape to fit into.

Figure 4:
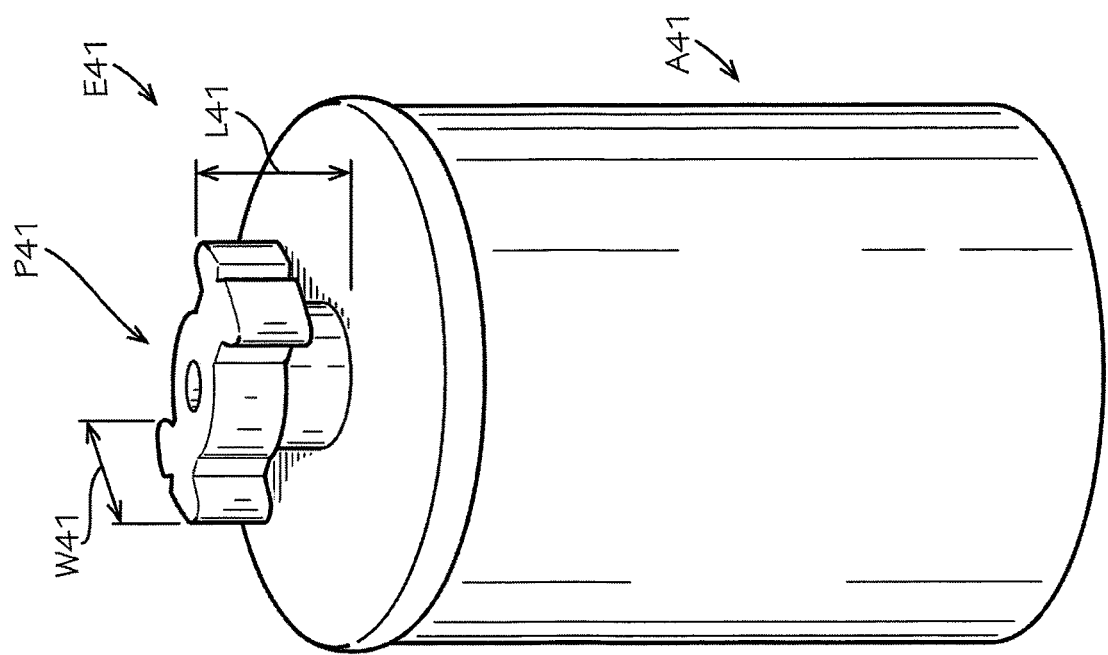
FIG. 4 illustrates a perspective view of a pillar beam end for connecting a pillar beam to an SLS mount.

FIG. 4 illustrates a pillar beam end for connecting a pillar beam to an SLS mount.

Referring to FIG. 4, a pillar beam end E41 is located on a rounded end of a pillar beam A41. The pillar beam end E41 includes a protruding portion P41 that is elevated in a direction away from the pillar beam. The protruding portion P41 is shaped to correspond to an opening of an SLS mount (for example, as shown in FIG. 3) so that the protruding portion P41 may fit into an SLS mount.

The shape of the protruding portion allows it to interlock to an SLS mount. In FIG. 4, a length L41 of the protruding portion P41 is longer than a width W41 of the protruding portion P41. As will be described, the variance in length with respect to width enables the protruding portion to interlock to an SLS mount.

Figure 5:
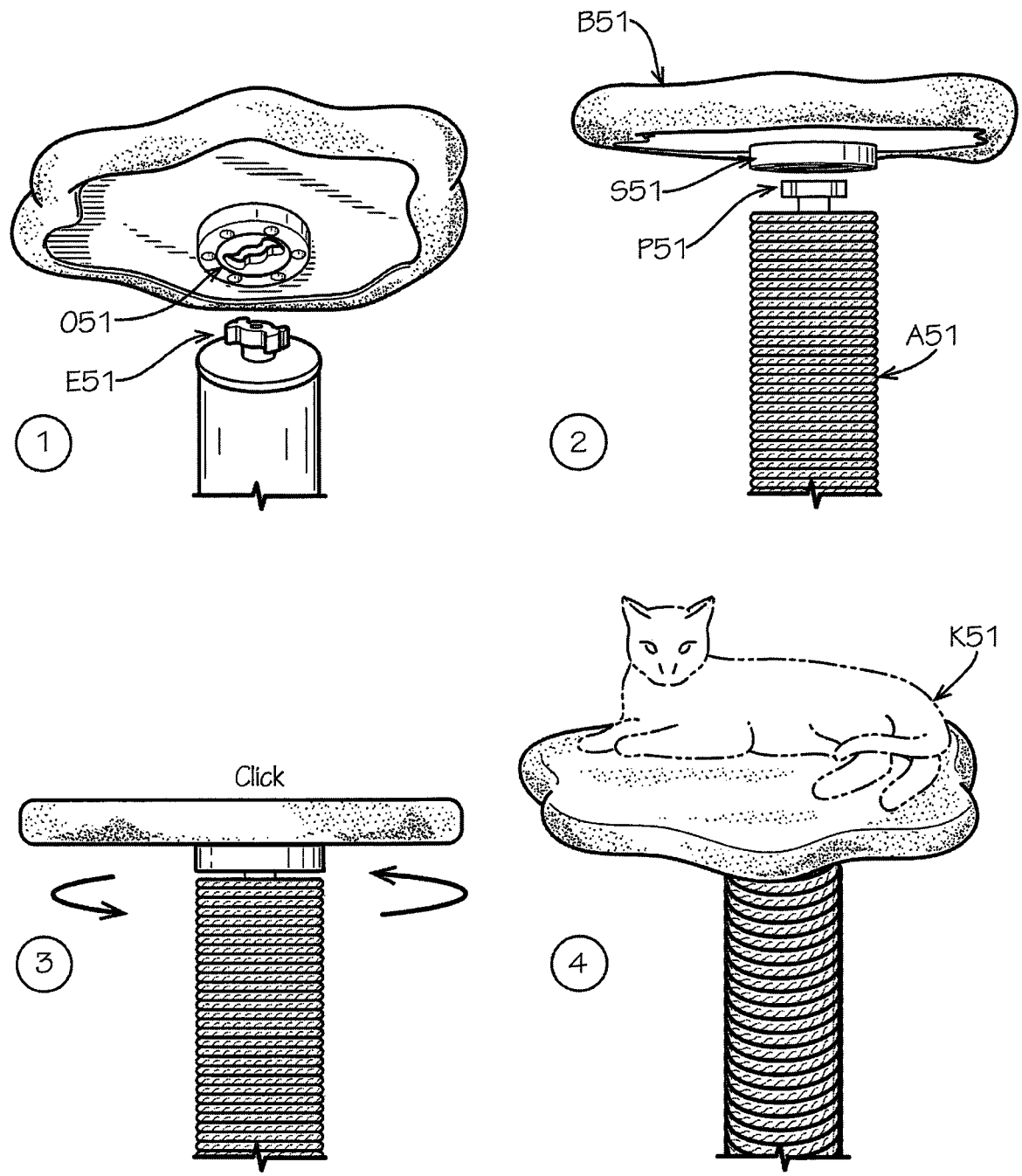
FIG. 5 illustrates steps to assemble a pet furniture apparatus using an SLS mount.

FIG. 5 illustrates visual steps to assemble a pet furniture apparatus using an SLS mount.

Referring to FIG. 5, a bottom surface of platform B51 includes SLS mount S51. First, to assemble the pet furniture apparatus, the platform B51 is oriented so that the surface (i.e., the bottom surface) having the SLS mount S51 faces a pillar beam end E51.

Second, the pillar beam end E51 is oriented to face the SLS mount S51 so that the protruding portion P51 is aligned with the opening O51 of the SLS mount S51. For example, a length of the opening O51 corresponds to a length of the protruding portion P51 so that the protruding portion P51 fits into the SLS mount S51.

Third, the protruding portion P51 of the pillar beam A51 is inserted into the opening O51 of the SLS mount S51 of the base platform B51 so that the pillar beam end E51 rests flush against the SLS mount S51. Once inserted, the pillar beam A51 may be rotated in a predetermined direction (i.e. clockwise or counter clockwise) to allow the SLS mount S51 to lock the platform B51 to the pillar beam A51.

Rotating the pillar beam A51 in a predetermined direction locks the SLS mount S51 because the protruding portion P51 is rotated with respect to the opening O51 of the SLS mount S51. When in a locked position, a length of the protruding portion P51 is not aligned with a length of the opening O51 of the SLS mount S51. For instance, the locked position may be a position when the pillar beam A51 is rotated about 90 degrees with respect to the SLS mount S51. In this position, a length of the protruding portion P51 will not be aligned with a length of the opening O51 of the SLS mount S51. The SLS mount S51, and the platform B51 to which it is attached, becomes attached to the pillar beam A51 when in the locked position.

The SLS mount may have a stopping mechanism to stop the rotation of the pillar beam A51 once it reaches a position predetermined as the locking position. The stopping mechanism may be used to help a user locate a predetermined locking position. For example, a stopping mechanism may stop the pillar beam A51 from being rotated more than 90 degrees with respect to the opening O51 of the SLS mount S51.

Fourth, once assembled, the pet furniture may be used by a pet K51. In FIG. 4, the pet K51 sits on the platform B51.

Compared to conventional assembly mechanisms, the pet furniture apparatus of the present disclosure is particularly sturdy when SLS mounts are in the locked position because an entire surface area of the SLS mount S51 sits flush against the pillar beam end E51. Thus, the weight of the pet K51 can be distributed among the entire surface area of the SLS mount S51, allowing the platform B51 to rest sturdy atop the pillar beam A51.

In addition, the pet furniture apparatus may be more quickly assembled than that of the conventional pet furniture apparatuses that use traditional attaching components, such as screws, nuts, or bolts. These traditional attaching components may require the use of tools, or simply take a long time to screw together. A pillar beam of the present disclosure only needs to be rotated a predetermined amount (i.e., about 90 degrees) with respect to an SLS mount. Therefore, an amount of labor required to assemble and disassemble the pet furniture assembly is reduced. In addition, accessories may also be stably mounted to the apparatus, such as heating or cooling pads for the comfort of the pet. In particular, a gel type pad may be placed on one or more of the platforms and heated or cooled for the pet's comfort.

While the present disclosure has been shown and described with reference to certain embodiments thereof, it will be apparent to those skilled in the art that the present disclosure is not limited to these embodiments, and various changes in form and details may be made therein without departing from the spirit and scope of the present disclosure as defined by the appended claims and their equivalents.

What is claimed is:

1. A method of assembling pet furniture, the method comprising:
    placing a first end of a pillar beam into a first locking mount mounted on a top surface of a base platform; and
    placing a second end of the pillar beam into a second locking mount mounted on a bottom surface of a top platform,
    wherein rotating the pillar beam in a predetermined direction causes the first end of the pillar beam to become locked into the first locking mount mounted on the top surface of the base platform while the second end of the pillar beam simultaneously becomes locked into the second locking mount mounted on the bottom surface of the top platform,
    wherein a first edge at a first end of the first locking mount is flush against the top surface of the base platform and a second edge at a second end of the first locking mount has an opening to allow a first portion of the first end of the pillar beam to penetrate the first locking mount without penetrating the base platform, and
    wherein a first edge at a first end of the second locking mount is flush against the bottom surface of the top platform and a second edge at a second end of the second locking mount has an opening to allow a second portion of the second end of the pillar beam to penetrate the second locking mount without penetrating the top platform.

2. The method of claim 1, further comprising:
    placing a first end of a second pillar beam into a third locking mount mounted on the base platform;
    placing a second end of the second pillar beam into a fourth locking mount mounted on the top platform; and
    attaching the top platform to the base platform by rotating the second pillar beam to lock the first end of the second pillar beam to the third locking mount mounted on the base platform and to lock the second end of the second pillar beam to the fourth locking mount mounted on the top platform.

3. The method of claim 1, further comprising:
    wherein locking the first end of the pillar beam to the second locking mount mounted on the bottom surface of the top platform and the second end of the pillar beam to the first locking mount mounted on the top surface of the base platform comprises rotating the pillar beam approximately 90 degrees relative to the second locking mount mounted on the bottom surface of the top platform and the first locking mount mounted on the top surface of the base platform.

4. The method of claim 1, further comprising:
    wherein the base platform is positioned parrallel to the top platform after the base platform is attached to the top platform.

5. The method of claim 1, further comprising:
    wherein an outer area of the pillar beam is comprised of a textile material for use by a pet.

6. The method of claim 1, further comprising:
    wherein the first end of the pillar beam contains a protruding portion capable of being placed into an opening on the first or second locking mount.

7. The method of claim 6, further comprising:
    wherein, when the protruding portion is placed into the opening of the first or second locking mount and the pillar beam is rotated approximately 90 degrees, the pillar beam becomes locked to the corresponding base platform or top platform.

8. The method of claim 1, further comprising:
    wherein the top platform further includes a third locking mount mounted on a top surface of the top platform.

9. The method of claim 8, further comprising:
    wherein the second locking mount mounted on the bottom surface of the top platform is positioned directly below the third locking mount mounted on the top surface of the top platform.

10. A pet furniture apparatus having an interlocking assembly system comprising:
    a base platform having a first locking mount mounted on a top surface thereon;
    a top platform having a second locking mount mounted on a bottom surface thereon; and
    a pillar beam with a first end and a second end,
    wherein when the first end of the pillar beam is placed into the first locking mount mounted on the top surface of the base platform and the second end of the pillar beam is placed into the second locking mount mounted on the bottom surface of the top platform, rotating the pillar beam in a predetermined direction causes the first end of the pillar beam to become locked into the first locking mount mounted on the top surface of the base platform while the second end of the pillar beam simultaneously becomes locked into the second locking mount mounted on the bottom surface of the top platform,
    wherein a first edge at a first end of the first locking mount is flush against the top surface of the base platform and a second edge at a second end of the first locking mount has an opening to allow a first portion of the first end of the pillar beam to penetrate the first locking mount without penetrating the base platform, and
    wherein a first edge at a first end of the second locking mount is flush against the bottom surface of the top platform and a second edge at a second end of the second locking mount has an opening to allow a second portion of the second end of the pillar beam to penetrate the second locking mount without penetrating the top platform.

11. The pet furniture apparatus of claim 10, further comprising:
a second pillar beam with a first end and a second end, wherein the top platform attaches to the base platform upon rotating the second pillar beam when the first end of the second pillar beam is placed into a third locking mount mounted on the base platform and the second end of the second pillar beam is placed into a fourth locking mount mounted on the top platform.

12. The pet furniture apparatus of claim 10, further comprising:
wherein locking the first end of the pillar beam to the second locking mount mounted on the bottom surface of the top platform and the second end of the pillar beam to the first locking mount mounted on the top surface of the base platform comprises rotating the pillar beam approximately 90 degrees relative to the second locking mount mounted on the bottom surface of the top platform and the first locking mount mounted on the top surface of the base platform.

13. The pet furniture apparatus of claim 10, further comprising:
wherein the base platform is positioned parrallel to the top platform after the base platform is attached to the top platform.

14. The pet furniture apparatus of claim 10, further comprising:
wherein an outer area of the pillar beam is comprised of a textile material for use by a pet.

15. The pet furniture apparatus of claim 10, further comprising:
wherein the first end of the pillar beam contains a protruding portion capable of being placed into an opening on the first or second locking mount.

16. The pet furniture apparatus of claim 15, further comprising:
wherein, when the protruding portion is placed into the opening of the first or second locking mount and the pillar beam is rotated approximately 90 degrees, the pillar beam becomes locked to the corresponding base platform or top platform.

17. The pet furniture apparatus of claim 10, further comprising:
wherein the top platform further includes a third locking mount mounted on a top surface of the top platform.

18. The pet furniture apparatus of claim 17, further comprising:
wherein the second locking mount mounted on the bottom surface of the top platform is positioned directly below the third mount mounted on the top surface of the top platform.

* * * * *